Figure 1:
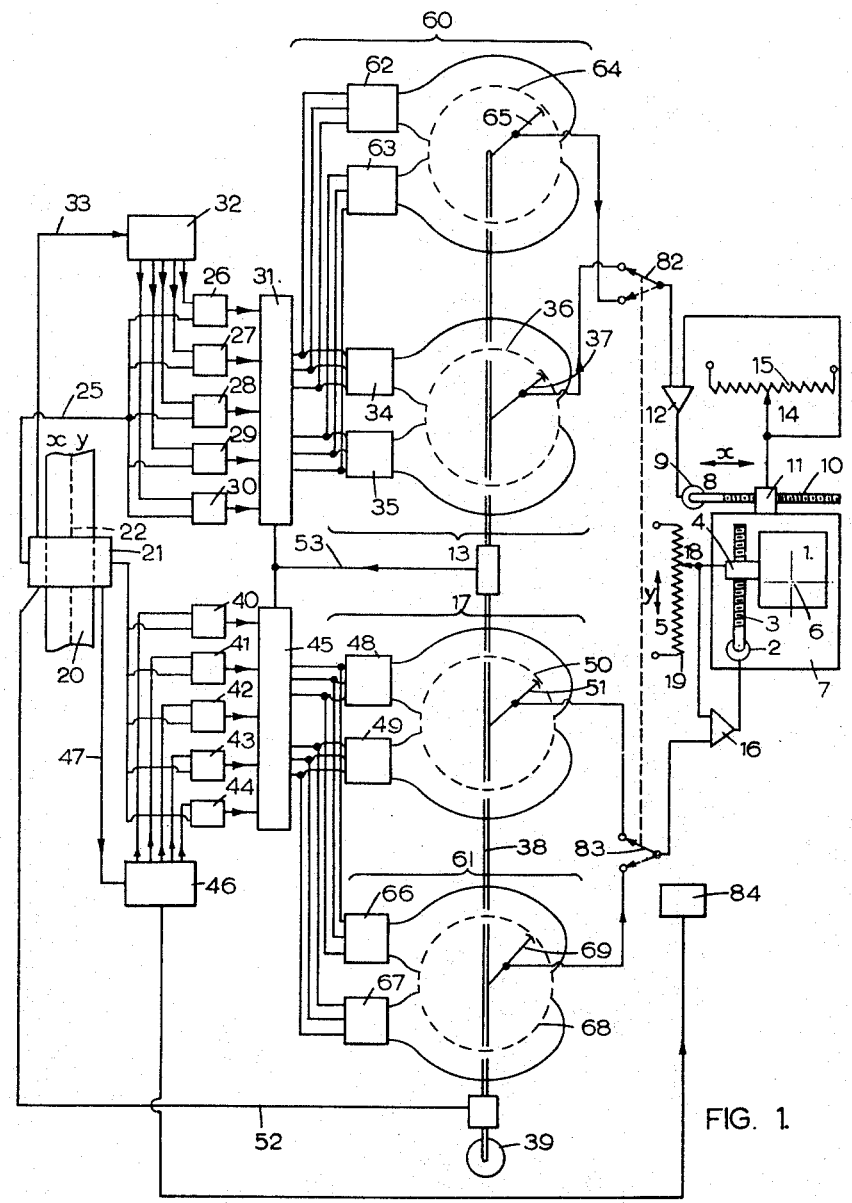

Oct. 10, 1961    R. A. CAIL ET AL    3,003,699
CONTROL OF AUTOMATIC MACHINES
Filed Aug. 7, 1956    2 Sheets-Sheet 2

Inventors
R. A. Cail
R. E. Spencer
By Glascock Downing Seebold
Attys.

United States Patent Office 3,003,699
Patented Oct. 10, 1961

3,003,699
CONTROL OF AUTOMATIC MACHINES
Roland Allan Cail and Rolf Edmund Spencer, London, England, assignors to Electric & Musical Industries Limited, Hayes, Middlesex, England, a company of Great Britain
Filed Aug. 7, 1956, Ser. No. 602,632
Claims priority, application Great Britain Aug. 10, 1955
13 Claims. (Cl. 235—197)

This invention relates to the control mechanism of automatic machines.

It has been proposed to provide control mechanism for automatic machines such that the relative displacement between a tool holder and a work carrier can be controlled in response to the output of interpolating means which receives input signals representing discrete reference points in a desired locus. For example in co-pending United States application Serial Number 581,038 filed on April 27, 1956, now Patent No. 2,929,555, control mechanism of this kind is described in which the relative displacement between a work carrier and a tool holder is controlled in different co-ordinate directions in response to quadratic interpolating means which generate output signals representing different co-ordinates as functions of a common non-geometric parameter. The arrangement described in the aforesaid application enables the machine to be brought temporarily to rest at the end point of a span, if for example it is desired to produce an abrupt change of direction. For example assuming that it is required to machine a straight line on AC on a workpiece, then as described in the aforesaid co-pending applications, the machine is brought temporarily to rest by applying to the quadratic interpolating means input signals representing the co-ordinates of three points A, B and C such that B divides the line AC in the ratio of 3:1.

When a straight line of substantial length has to be machined it is feasible to divide the line into a number of spans, the beginning and end spans being relatively short and divided unequally by the points for which input signals are recorded so as to give automatic acceleration and retardation at the beginning and end of the run. In this way accuracy at the corners can be combined with a high speed of operation. On the other hand there are many cases where the profile to be machined includes a number of short straight lines, or lines of uniform curvature, and the extra computation needed to divide these lines into a number of spans in order to produce automatic acceleration at the beginning of the line and automatic retardation at the end may be embarrassing.

Moreover the time required by the machine to read the extra data, if the spans are short, may impose a restriction on the speed of operation of the machine, since the time required to read data is often the limiting factor in the operational speed, especially with a hydraulic machine. If the spans are sufficiently long to give time for reading the operational speed may still be less than the optimum, since if acceleration is linear over a complete span, the average speed of the machine cannot be more than half the maximum speed.

The object of the present invention is to provide an improved control mechanism for an automatic machine in which automatic acceleration or retardation can be achieved on relatively short spans without resorting to the expedient described above.

According to the present invention there is provided control mechanism for producing signals suitable for controlling displacement of part of an automatic machine, comprising a source of input signals representing values of a function at relatively widely spaced values of a variable of the function, a series of spaced output terminals, interpolating means for setting up at said output terminals interpolated signals representing values of said function at a series of relatively close values of said variable, a selector movable successively from one output terminal to the next to derive the interpolated signals, and drive means for said selector, the rate of movement of said selector in response to the drive means and the spacing of said output terminal and of said series of values of the variable being predetermined one relative to the other to produce a non-linear rate of change of said variable, whereby speed variation of a machine part responsive to said interpolated signals can be produced independently of the input signals from said source.

In one form of the invention the output terminals are uniformly spaced and the interpolating means set up at said output terminals interpolated signals representing values of the function at a series of non-uniformly spaced values of said variable, so that a linear rate of movement of the selector produces a non-linear rate of change of the variable.

In another form of the invention the output terminals are uniformly spaced and the interpolating means sets up at said output terminals interpolated signals representing values of the function at a series of uniformly spaced values of the variable. In this case a non-linear rate of change of the variable is produced by moving the selector at a non-uniform rate.

Figure 2:
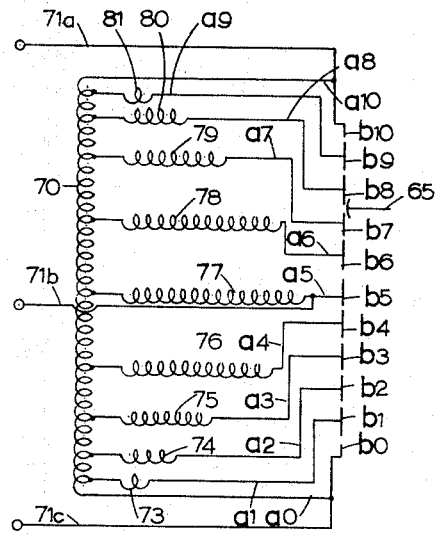
Figure 3:
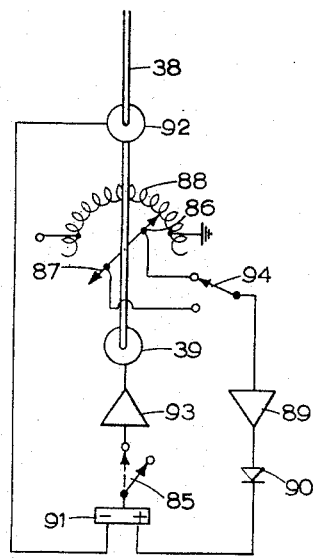
Figure 4:
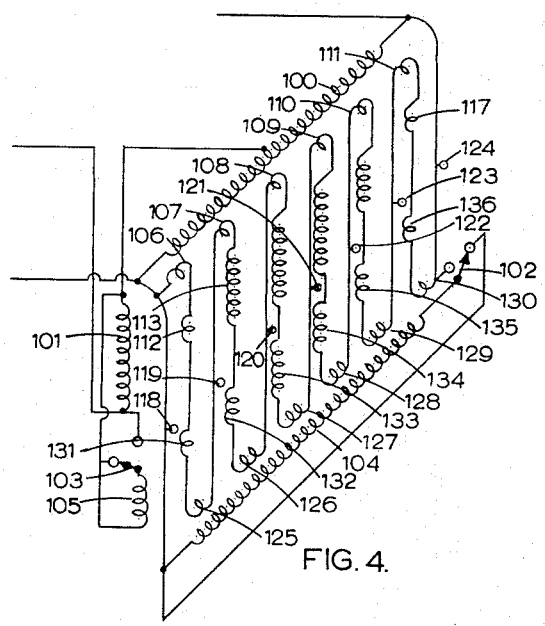

In order that the invention may be clearly understood and readily carried into effect, the invention will be described with reference to the accompanying drawings, in which:

FIGURE 1 illustrates mainly in block form one example of an automatic machine having control mechanism according to the first-mentioned form of the invention, FIGURE 2 is a detail view of part of FIGURE 1, FIGURE 3 illustrates one example of the second-mentioned form of the invention, FIGURE 4 is an alternative form of interpolator which can be used in place of two interpolators in the mechanism shown in FIGURE 1.

Referring to the drawing, reference 1 represents the worktable of an automobile machine, for example an automatic milling machine, mounted on a slide so that it can be displaced in a horizontal plane in one co-ordinate direction by a servo-motor 2 through the intermediary of a lead screw 3 and nut 4. The servo motor 2 can effect displacements in the directions denoted by the arrow 5 and it controls the $y$ co-ordinate displacement of the worktable 1 with respect to the axis of the tool holder, which is represented in the drawing by the reference 6, and may be taken as determining the origin of a two dimensional co-ordinate system. The slide on which the table 1 is mounted is represented by the rectangle 7 and the slide can be moved in a horizontal plane in the directions indicated by the arrow 8 by means of a servo motor 9, through the intermediary of screw and nut mechanism 10 and 11. The servo-motor 9 therefore controls the $x$ co-ordinate displacement between the worktable 1 and the axis 6 of a tool holder. The tool holder itself is not shown in the drawing. Relative displacements between the table 1 and the tool holder in the indicated co-ordinate directions are denoted respectively $x$ and $y$ and in practice are controlled to cause the tool axis to describe a locus such that a desired profile is cut on a workpiece secured to the table 1. The operation of the servo-motor 9 is controlled by the output of an amplifier 12 which receives virtually continuously variable input signals from quadratic interpolating means represented in general by the reference 13 and negative feedback signals from the tap 14 of potentiometer 15, the tap being driven in known manner so that the signal derived from the potentiometer is a voltage analogue of the instantaneous value of $x$.

Similarly the servo-motor 2 derives its input signal from an amplifier 16 which receives a virtually continuously variable input signal from quadratic interpolator means represented in general by the reference numeral 17. The amplifier 16 also receives a negative feedback signal which is the analogue of the instantaneous value of $y$ from the tap 18 of potentiometer 19. The quadratic interpolating means 13 and 17 set up, as output signals, alternating voltages having amplitudes which are analogous to the desired values of $x$ and $y$ at any instant and the potentiometers 15 and 19 are energised with alternating voltages of fixed amplitude and having the same phase as the output voltages from the quadratic interpolating means. The amplifiers 12 and 16 may, it will be understood, incorporate rectifying means as required. Moreover, the potentiometers 15 and 19 are merely shown symbolically and may in practice comprise several cascaded rotary potentiometers.

The quadratic interpolating means 13 and 17 are responsive to signals representing discrete values of $x$ and $y$ recorded on a punched tape 20 and derived therefrom by means of a tape reader 21. The values on the tape may be recorded in two columns the division between which is represented in the drawing by the dotted line 22. It will be assumed that the column to the left of 22 contains successive discrete values of $x$ and the column to the right of 22 contains successive discrete values of $y$. It will also be assumed that each row of holes recorded on the tape corresponds to a single value of $x$ and the corresponding value of $y$, the rows being equally spaced. Many other methods of recording may however be adopted. Each row therefore normally represents the $x$ and $y$ co-ordinates of a reference point of the locus to be described by the axis 6 of the tool holder. When the tape reader is operated to sense a recorded value of say $x$, the output is in the form of a group of pulses which is a binary-decimal code representation of the corresponding value of $x$. This group of pulses is applied by a series of parallel conductors, which are presented in the drawing by a single connection 25, to five temporary stores denoted by the references 26 to 30 inclusive. The stores 26 to 30 are normally insensitive to signals applied to them by the tape reader but are sensitised in cyclic order by a programme unit 32, an interlock being provided by the connection 33 between the programme unit 32 and the tape reader 21 to ensure proper synchronism between the tape reader 21 and the programme unit 32.

For the purposes of the present application each store may be regarded merely as an auto-transformer, the tap on which is set in response to binary decimal code signals applied to it from the tape 20, so that the alternating voltage derived from the tap has an amplitude which is the analogue of the corresponding co-ordinate value. Therefore when any of the stores 26 to 30 is sensitised to receive the output from the tape reader 21, the respective store is caused to set up an alternating voltage whose amplitude is the analogue of the corresponding reference point value of $x$ derived from the record 20. The voltage analogues set up by stores 26 to 30 are applied by a selector switch 31 in successive groups of three to the three input terminals of a quadratic interpolator 34 and to the three input terminals of a second quadratic interpolator 35, the interpolators 34 and 35 forming part of the means 17. Each of the interpolators 34 and 35 has eleven output studs, and the two groups of output studs are arranged to form a stud circle represented by the dotted line 36. The end studs of each group of eleven are however "half" studs, such that each half stud forms, with the adjacent half stud of the other interpolator a composite stud which, though composed of two electrically separate halves, corresponds in other ways to the other studs. In FIGURE 1 for simplicity, output connections are shown from the interpolators to the first and last "half" studs of each group only. The stud circle 36 is scanned by a contact 37 mounted on a shaft 38 which is driven by an electric motor 39. The operation of the selector switch 31 is controlled by the shaft 38, as indicated by the connection 53 so that when a sequence of signals representing the $x$ co-ordinates of successive reference points, say $x_1, x_2, x_3 \ldots$ etc., are applied in cyclic order to the stores from the record 20, $x_1, x_2$ and $x_3$ are applied to the interpolator 34 and $x_3$, $x_4$ and $x_5$ are applied to the interpolator 35. Then $x_5$, $x_6$ and $x_7$ are applied to the interpolator 34, $x_7$, $x_8$ and $x_9$ are applied to the interpolator 35 and so on. After the stores 26, 27 and 28 have been sensitised to set up the three voltage analogues $x_1, x_2$ and $x_3$, interpolation can be started by rotation of the shaft 38 to cause the contact 37 to traverse the group of output studs of the interpolator 34 and thus interpolate over the full span from $x_1$ to $x_3$. While this is in progress the analogues $x_4$ and $x_5$ are set up in the stores 29 and 30 and $x_3$, $x_4$ and $x_5$ are applied to the input terminals of the interpolator 35, so that as continued rotation of the shaft carries the contact 37 to the group of output studs of the interpolator 35, the interpolator is in a condition to take over from the interpolator 34 and produce interpolation in the span from $x_3$ to $x_5$. This sequence of operation, which constitutes the normal operation of the machine continues unless instructions for an alternative mode of operation are recorded on the tape 20. It will be appreciated that the selector switch 31 is required virtually to advance the stores 26 to 30 by one position, with respect to the input terminals of the interpolators 34 and 35 once per half revolution of the shaft 38. As described in co-pending United States application Serial Number 459,814, filed on October 1, 1954, now Patent No. 2,928,604, the output voltage from the brush 37 is an alternating voltage and the brush 37 is of the make-before-break type, so that a virtually continuously variable output voltage is derived from the brush, this voltage being the input signal to the amplifier 12.

Signals representing the $y$ co-ordinates of successive reference points derived from the tape reader 21 are applied by a connection 54 to a further series of five temporary stores 40 to 44, sensitised in the same way as the stores 26 to 31 by a programme unit 46 which is interlocked with the tape reader as represented by a connection 47. The voltage analogues set up by the stores 40 to 44 are applied by a selector switch 45 to the three input terminals of a quadratic interpolator 48 and to the three input terminals of another quadratic interpolator 49 in the same kind of sequence as that described for the stores 26 to 30 and the interpolators 34 and 35. The interpolators 48 and 49 form part of the interpolating means denoted in general by the reference 17 and their output voltages are applied to the respective halves of a stud circle 50 corresponding to the stud circle 36. The stud circle 50 is scanned by a make-before-break contact 51 mounted on the same shaft 38 and in the same relative position as the contact 37. The voltage picked up by the contact 51 forms the input signal to the amplifier 16 for the servo-motor 2. As aforesaid shaft 38 is driven by servo-motor 39 and a synchronous link represented by the connection 52 is provided between the shaft 38 and the tape reader 21, to ensure that the interpolating means 13 and 17 do not over-run the tape reader since it will be appreciated that the tape reader must always be at least three positions ahead of the interpolating means.

The parts of the machine so far described have been shown merely in block form, in order to complete the illustration of the present invention. The constructional details, which do not form part of the present invention, are described in the complete specification of co-pending United States patent application Serial No. 581,038.

However as compared with the machine described in that complete specification the machine illustrated in FIGURE 1 thereof has additional interpolating means for each co-ordinate of the relative displacement which can be effected between the work table 1 and the tool holder. The additional interpolating means for the $x$ co-ordinate is denoted in general by the reference 60 and the additional interpolating means for the $y$ co-ordinate is denoted in general by the reference 61. The interpolating means 60 comprises two individual quadratic interpolators 62 and 63 and the voltage analogues set up by the stores 26 to 30 are applied to the three input terminals of the interpolator 62, and to the three input terminals of the interpolator 63 in cyclic order by the selector switch 31. The outputs of the two interpolators are applied, as described for the interpolators 34 and 35, to two groups of eleven studs arranged to form a stud circle 64 scanned by a make-before-break contact 65 which is mounted on the shaft 38. The additional interpolating means 61 likewise comprises two quadratic interpolators 66 and 67 which receive voltage analogues representing discrete values of $y$ from the stores 40 to 44 via the selector switch 45. The interpolators 68 and 69 have respective groups of output studs arranged to form to stud circle 68 (like stud circle 50) scanned by the contact 69 mounted on the shaft 38.

As distinct from the interpolators 34, 35, 48 and 49, the interpolators 62, 63, 66 and 67 are adapted so that the interval between successive output studs represent unequal variations of the independent variable although the studs are equiangularly spaced. For example each of the interpolators may be of the construction illustrated in FIGURE 2, which however will be assumed to represent the interpolator 62 and comprises an autotransformer 70 having, say, 100 turns. The auto-transformer is tapped at 0, 2, 8, 18, 32, 50, 68, 82, 92, 98, and 100 turns respectively and the tappings are connected by conductors $a0$ ... $a10$ to studs $b0$ ... $b10$ which although shown arranged in straight line of FIGURE 2 form one half of the studs circle 64 of FIGURE 1. The three voltage analogues applied to the input terminals of the interpolator at any one time by the switch 31 are fed as shown by the leads $71a$, $71b$ and $71c$ to the contact studs $b0$, $b5$ and $b10$. The leads $a1$ ... $a9$ include series connected transformer windings 73 to 80 which are coupled together as described in co-pending United States patent application Serial No. 459,814 so as to yield quadratic interpolation, that is so that voltages can be picked off from the studs $b0$ to $b10$ representing successive closely spaced points on a quadratic curve drawn through the points represented by the three input signals. It will however be appreciated that although the number of turns on the winding 73 to 81 require to be related according to quadratic law the number of turns required differs from that in the case of the interpolators 34, 35, 48 and 49 in which the auto-transformers corresponding to 63 are tapped at equal intervals of say ten turns.

As aforesaid the machine shown in FIGURE 1 normally operates in the manner described in co-pending United States patent application Serial No. 581,038 and the additional interpolating means 60 and 61 are open-circuited at switches 82 and 83, which are normally in the conditions shown by full lines, so that the outputs are derived from the interpolating means 13 and 17. The switches 82 and 83 are ganged and controlled by a relay represented by the rectangle 84. The relay 84 can be energised in response to predetermined signal recorded on the record 20 and cause the switches 82 to 83 to move to the conditions shown by full lines, a suitable interlock being provided with the shaft 38 if necessary to ensure that a changeover of the switches 82 and 83 only occurs simultaneously with the change over from one interpolator to another in the various interpolating means. The operation of relays in response to predetermined code signals is well known in the art, and details of the operating mechanism for the relay 84 have not therefore been shown. For example it may be operated by a code signal not used for representing a co-ordinate or by a code signal, in a track or position of the tape reserved for non-dimensional instructions. When the relay 84 is operated and the switches 82 and 83 change to the full line positions, interpolating means 13 and 17 are open-circuited and the interpolating means 60 and 61 are switched into operation. When the interpolating means 60 and 61 are in operation then, although the shaft 38 continues to rotate at a constant rate, the independent variable varies approximately over two parabolic stages having vertices at the beginning and end of the span covered by the interpolators from which the outputs are derived. Normally the additional interpolating means 60 and 61 will remain in operation only for a single span and thereafter control will be resumed by the interpolating means 13 and 17, but the provision of two interpolators in each of the means 60 and 61 enables the change-over to occur at any arbitrary point.

If the additional means 60 and 61 are required for operation only on straight line spans, quadratic windings such as 73 to 81 are unnecessary in the interpolators 62, 63, 66 and 67. In this case when recording instructions for the additional interpolators no instruction is required for an intermediate point in the span involved and only two input connections to each of the additional interpolators is required.

In the form of the invention described with reference to FIGURES 1 and 2, the tapping points on the transformer 70 and in the corresponding transformers in the other interpolators 63, 34, 35, 48, 49, 66 and 67 representing a series of relatively close values of the variable or parameter with respect to which the functions $x$ and $y$ are interpolated, these values lying within the span defined by the input signals applied to the respective interpolators. On the other hand, the studs $b0$ to $b10$ and the corresponding studs for the other interpolators correspond to output terminals at which the transformers in the interpolators set up interpolated signals representing values of the function $x$ or $y$ (as the case may be) at the series of values of the variable represented by the aforesaid tapping. In the case of the interpolators 34, 35, 48 and 49 the tapping represents a series of uniformly spaced values of the variable, but in the case of the interpolators 62, 63, 66 and 67 the tapping represents a series of non-uniformly spaced values of the variable. In all cases however the output terminals are uniformly spaced and the shaft 39 and with it the contacts or selectors 37, 51, 65, and 69 normally rotates at a uniform rate, or is stepped around at a uniform rate, if driven by a stepping mechanism. Therefore the interpolating means 13 and 17 (when operative) produce interpolation in response to a linear rate of change of the variable, whilst the interpolating means 60 and 63 (when operative) produce interpolation in response to a non-linear rate of change of the variable. Indeed, since as aforesaid the independent variable varies approximately over two parabolic stages when the interpolators 62, 63, 66 and 67 are operative, the variable has initially a linear rate of increase and subsequently a linear rate of increase within each span. Therefore it is possible to linearly increase or decrease the cutting rate of the machine independently of the choice of the reference points recorded on the tape 20 and in response only to the predetermined signal which operates the relay 84.

In the alternative form of the invention shown in FIGURE 3, the additional interpolating means 60 and 61 are not required but the speed of the shaft 38 is controllable automatically by providing a control circuit for the servomotor 39 which is normally inoperative by virtue of a normally open switch 85 which can however be closed by a relay similar to 84 of FIGURE 1. When the switch 85 is open, it will be assumed that the motor 39 has a constant input signal applied to it so that the motor 39 tends to run at a constant speed. However when the switch 85 is closed in response to a suitable control signal, the speed of the motor is controlled by the signal picked up by one or other of two contacts 86 and 87 mounted on the shaft 38. The contacts 86 and 87 alternately scan an inductive potentiometer 88 which has an angular extent slightly exceeding 180° and during any span of the independent variable during which the switch 85 is closed, the voltage picked up by the contact 86 or 87 represents the angular displacement which the servo-motor 39 has yet to produce in order to complete the span. This voltage is applied through a non-linear amplifier 89 and detector 90 as one input to a differencing circuit 91 which receives with opposite polarity a second input from a tacho-generator 90 driven by the shaft 38. The difference voltage produced by the circuit 91 is applied via an amplifier 93 and then to the servo motor 39. The amplifier 89 has a non-linear characteristic related to the deceleration law of the servo motor 39 as described in United States patent specification No. 2,766,412, and is such that the voltage from the rectifier 90 always exceeds that from the tachometer 92 until such time as the displacement still required to complete the span is equal to the stopping distance of the motor 39 under full reverse torque, whereupon the output of the amplifier becomes less than that of the tachometer 92. With this arrangement, whenever the switch 85 is closed in accordance with the predetermined control signal recorded on the tape 20, the servo-motor 39 is accelerated from the beginning of the corresponding span to its equilibrium velocity (if not already at that velocity), and this velocity is maintained until the interpolation progresses so closely to the end of the span that the signal derived from the potentiometer 89 and rectifier 90 is less than the signal derived from the tacho-generator 91. Thereupon maximum reverse torque is applied to the servo-motor 39, and causes the motor to be decelerated at such a rate that the motor is brought nearly to rest at the end of the span, only sufficient velocity being maintained to allow the servo-motor to coast across the end point of the span and to allow the next set of instructions to be operated upon.

The two contacts 86 and 87 are provided so as to cover alternate spans of the input information and switch 94 is provided for connecting the contacts alternately to the differencing circuit 91, the switch 94 being operated in any suitable manner from the shaft 38 so that the change-over from one contact to the other is arranged to occur simultaneously with the change over from one interpolator to another.

The instructin for operating the switch 85 may be that recorded on the record 20 in association either with the beginning or end point of the corresponding span.

It will be understood that in the case of FIGURE 3, the interpolated signals set up at the output studs correspond always to a series of uniformly spaced values of the variable but by driving the shaft 38 at a non-uniform rate during a span, the studs are selected at a non-uniform rate so as to produce interpolation in response to a non-linear rate of change of the variable.

The modified form of interpolator shown in FIGURE 4, if adopted for each of the interpolators 34, 35, 48 and 49 enables the interpolators 62, 63, 66 and 67 to be dispensed with, as well as the stud switches associated with the latter interpolators. According to FIGURE 4 the interpolator comprises a primary transformer winding 100 and the input signals to be interpolated are applied as shown to the ends of this winding and to the midpoint thereof, in the latter case through a series connected winding 101. Moreover the interpolator comprises the switches 102 and 103 which are ganged together and correspond to the switches 82 and 83 of FIGURE 1. Their normal condition is as shown in the drawing and in this condition they short-circuit two further transformer windings 104 and 105. When in response to an input instruction the switches 102 and 103 are changed to their alternate conditions, the winding 104 is connected in parallel with the winding 100 whilst the winding 105 is connected in parallel with the winding 101. A series of secondary windings 106 to 111 are coupled to the winding 100, the windings 106 to 111 having equal numbers of turns. A second series of windings 112 to 117 are coupled to the winding 111 and their numbers of turns are related to a quadratic law. The interpolated output signals are derived from a series of tappings 118 to 124 these tappings being connected say to one group of studs on the stud circle 36. Assuming that the switches 102 and 103 have the conditions shown, numbers of turns on the windings 106 to 117 are predetermined in such way that the voltages set up at the tappings 118 to 124 are those which would normally be applied by an interpolator such as 34 to its group of output studs, the windings 104 and 105 having no effect in the output since they are short-circuited.

A series of windings 125 to 130 are coupled to the winding 104 and another series of windings 131 to 136 are coupled to the winding 105 and when the switches 102 and 103 are changed to their alternate conditions, it is arranged that the additional voltages induced by the windings 125 to 136 at the tappings 110 to 124 (which additional voltages can be either positive or negative as required) cause the resultant voltages at the output studs to correspond to those which would under similar circumstances be produced at the output studs of an interpolator such as shown in FIGURE 2.

Only seven output points are shown in the arrangement of FIGURE 4 but it will be understood that this number can be varied as required. Moreover the end studs of each group of studs in the stud circles are arranged to correspond only to "half" studs, as descibed above.

Obviously the invention is applicable to mechanism which uses other than cartesian co-ordinate systems and also to mechanism allowing for three dimensional control. Moreover the control signals generated by the control mechanism may be adapted to displace other parts of machine, rather than the worktable. For example, one or more of the co-ordinate displacements may be imparted to the tool holder.

When sub-interpolation is employed, the brushes of the quadratic interpolating means may not be continuously rotated, as by the shaft 34, but may be advanced intermittently by a stepping switch operated by the high speed shaft of the sub-interpolating means.

The record used for the control mechanism may be other than a punched tape and the recorded signals instead of defining points on the locus of the tool axis (as indicated above for simplicity), may define points on the actual profile to be cut. In this case provision is required to compensate for the dimension of the tool, and this provision may be as described in co-pending United States patent application Serial No. 518,912, filed on June 29, 1955.

What we claim is:

1. Control mechanism for producing signals suitable for controlling displacement of part of an automatic machine, comprising a source of input signals representing values of a function at relatively widely spaced values of a variable of the function, interpolating means having at least three input terminals for receiving signals from said source, a greater number of uniformly spaced output terminals, and couplings from said input terminals to said output terminals for producing non-linear interpolation of signals applied to said input terminals thereby to set up at said output terminals interpolated signals representing values of the function at a series of relatively close values of said variable, a selector movable successively from one output terminal to the next to derive the interpolated signals, and drive means for moving said selector at a predetermined rate, said couplings being predetermined to cause the interpolated signal set up at said terminals to correspond to a nonuniformly spaced series of values of said variable, whereby a linear rate of movement of said selector derives signals corresponding to a non-linear rate of change of said variable.

2. Control mechanism for producing signals suitable for controlling displacement of part of an automatic machine, comprising a source of input signals representing values of a function at relatively widely spaced values of a variable of the function, interpolating means having a plurality of input terminals for receiving signals from said source, a greater number of uniformly spaced output terminals, and couplings from said input terminals to said output terminals for producing interpolation of signals applied to said input terminals, thereby to set up at said output terminals interpolated signals representing values of the function at a series of relatively close values of said variable, a selector movable successively from one output terminal to the next to derive said interpolated signals, and drive means for moving said selector at a non-uniform rate, said couplings being predetermined to cause the interpolated signals set up at said output terminals to correspond to a uniformly spaced series of values of said variable, whereby a non-linear rate of movement of said selector derives signals corresponding to a non-linear rate of change of said variable.

3. Control mechanism according to claim 2, said drive means including a motor mechanically coupled to said selector, means for normally energising said motor to move the selector at a predetermined rate, means for sensing the distance of said selector from the last of said output terminals, and means for applying predetermined deceleration of said motor when said distance corresponds approximately to the distance required to stop the motor in response to said deceleration.

4. Control mechanism for producing signals suitable for controlling displacement of part of an automatic machine, comprising a source of input signals representing values of a function at relatively widely spaced values of a variable of the function, interpolating means connected to said source and including couplings for establishing a series of closer values of said variable and being responsive to signals from said source for deriving interpolated signals representing the values of said function at said series of values of the variable, and said interpolating means having one condition in which said couplings correspond to one series of values of said variable and another condition in which said couplings correspond to another series of values of said variable, the spacing of said one series of values being non-linearly related to that of the other series of values, and switch means for selectively switching said interpolating means to said conditions.

5. Control mechanism according to claim 4, said interpolating means comprising a plurality of input terminals for receiving signals from said source, a greater number of output terminals, and transformer means intercoupling said input terminals and said output terminals, said transformer means having one condition with one series of turns ratios between said input terminals and output terminals, and a second condition with another series of turns ratios between said input terminal and output terminal, said switch means being operative to switch said transformer means selectively from one condition to the other, thereby to selectively switch said interpolating means from said one condition to said other condition.

6. Control mechanism according to claim 4, said interpolating means comprising a first interpolator including at least three input terminals for receiving signals from said source, a greater number of output terminals and at leat two transformers interconnecting said input terminals and the respective output terminals, and a second interpolator including at least two input terminals for receiving signals from said source, a greater number of output terminals, and at least one transformer interconnecting said latter input terminals and the respective output terminals, said switch means being operative to selectively enable and disable said first and second interpolators.

7. Control mechanism according to claim 4, said source of input signals comprising reading means for deriving signals from a record, a plurality of temporary stores for simultaneously storing groups of said signals and means for selecting groups of the stores in cyclic order and applying signals stored therein as input signals to said interpolating means, and said switch means being responsive to a predetermined signal from said reading means.

8. Control mechanism for producing signals suitable for controlling displacement of a part of an automatic machine, comprising a first source of input signals representing values of one co-ordinate of successive points on a locus corresponding to relatively widely spaced values of a parameter, a second source of input signals representing values of a second co-ordinate of the same points of said locus, first interpolating means connected to said first source, second interpolating means connected to said second source, said first and second interpolated means having coupled means for establishing a series of closer values in said parameter and being responsive to signals from the respective sources for deriving interpolated signals representing said first and second co-ordinates of points on said locus corresponding to said series of values of said parameter, said first and second interpolating means having one condition in which said coupled means correspond to a uniformly spaced series of values of said parameter and another condition in which said coupled means correspond to a non-uniformly spaced series of values, and switch means for selectively switching said interpolating means to one or other of said conditions of said parameter.

9. Control mechanism for producing signals suitable for controlling displacement of part of an automatic machine, comprising a source of input signals representing values of a function at relatively widely spaced values of a variable of the function, interpolating means connected to said source and including couplings for establishing a series of closer values of said variable and being responsive to signals from said source for deriving interpolated signals representing the values of said function at said series of values of the variable, and said interpolating means having one condition in which said couplings correspond to non-linear interpolation of the function at a series of uniformly spaced values of said variable, and a second condition in which said couplings correspond to linear interpolation of the function at a series of non-uniformly spaced values of said variable, and switch means for selectively switching said interpolating means to said conditions.

10. Control mechanism for producing signals suitable for controlling displacement of part of an automatic machine, comprising a source of input signals representing values of a non-linear function at relatively widely spaced values of a variable of the function, interpolating means having at least three input terminals for receiving signals from said source, a greater number of spaced output terminals, and couplings from said input terminals to said output terminals for producing at said output terminals, in response to signals received by said input terminals, non-linearly interpolated signals representing values of said function at relatively close values of said variable, the spacings of said relatively close values of the variable being determined by said couplings, a selector movable successively from one output terminal to the next to derive the interpolated signals, and drive means for said selector to cause said selector to derive signals successively from said output terminals in accordance with a rate of change of said variable determined by the relationship connecting the rate of movement of said selector, the spacing of said output terminals and the spacing of said relatively close values of said variable, and said relationship being predetermined to correspond to a non-linear rate of change of said variable.

11. Control mechanism for producing signals suitable for controlling displacement of part of an automatic machine, comprising a source of input signals representing values of a function at relatively widely spaced values of a variable of the function, interpolating means having a plurality of input terminals for receiving signals from said source, a greater number of output terminals, and couplings from said input terminals to said output terminals to produce at said output terminals in response to signals received by said input terminals interpolated signals representing values of said function at relatively close values of said variable, the spacings of said relatively close values of the variable being determined by said couplings, a selector movable successively from one output terminal to the next to derive the interpolated signals, and drive means for said selector to cause said selector to derive signals successively from said output terminals in accordance with the rate of change of said variable determined by the relationship connecting the rate of movement of said selector, the spacing of said output terminals and the spacing of said relatively close values of the variable, and means operable to change the mechanism from one condition in which said relationship corresponds to one rate of change of said variable to another condition in which said relationship corresponds to another rate of change of said variable non-linear with respect to said first rate of change.

12. Control mechanism for producing signals suitable for controlling displacement of part of an automatic machine, comprising a source of input signals representing values of the function at relatively widely spaced values of the variable of the function, interpolating means comprising a plurality of input terminals, a series of spaced output terminals, and couplings from said input terminals to said output terminals for producing at said output terminals, in response to signals received by said input terminals, interpolated signals representing values of said function at relatively close values of said variable, the spacing of said relatively close values of said variable being determined by said couplings, a selector movable successively from one output terminal to the next to derive the interpolated signals, and drive means for said selector to cause said selector to derive signals successively from said output terminals in accordance with the rate of change of said variable determined by the relationship connecting the rate of movement of said selector, the spacing of said output terminals, and the spacing of said relatively close values of said variable, and means operable to change the mechanism from one condition in which said relationship corresponds to a linear rate of change of said variable to another condition in which said relationship corresponds to a rate of change of said variable which initially increases linearly and thereafter decreases linearly within the range of said variable covered by said output terminals.

13. Control mechanism for producing signals suitable for controlling displacement of part of an automatic machine, comprising a source of input signals representing values of a function at relatively widely spaced values of a variable of the function, interpolating means having a plurality of input terminals for receiving signals from said source, a greater number of output terminals, and couplings from said input terminals to said output terminals to produce at said output terminals in response to signals received by said input terminals interpolated signals representing values of said function at relatively close values of said variable, the spacings of said relatively close values of the variable being determined by said couplings, a selector movable successively from one output terminal to the next to derive the interpolated signals, and drive means for said selector to cause said selector to derive signals successively from said output terminals in accordance with the rate of change of said variable determined by the relationship connecting the rate of movement of said selector, the spacing of said output terminals, and the spacing of said relatively close values of said variable, and said relationship being predetermined to correspond to a rate of change of said variable which initially increases linearly and thereafter decreases linearly within the range of said variable covered by said output terminals.

References Cited in the file of this patent

UNITED STATES PATENTS

| | | |
|---|---|---|
| 2,748,665 | Senn | June 5, 1956 |
| 2,784,359 | Kamm | Mar. 5, 1957 |